May 20, 1969   B. K. SLONNEGER   3,445,799
ELECTRIC WINDING PROTECTIVE MEANS
Filed Oct. 17, 1966
FIG.1.
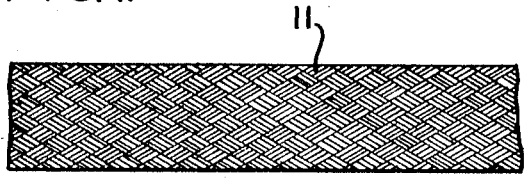
FIG.2.
FIG.3.
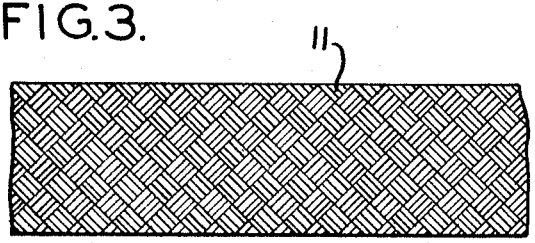
FIG.4.
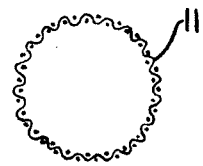
FIG.5.
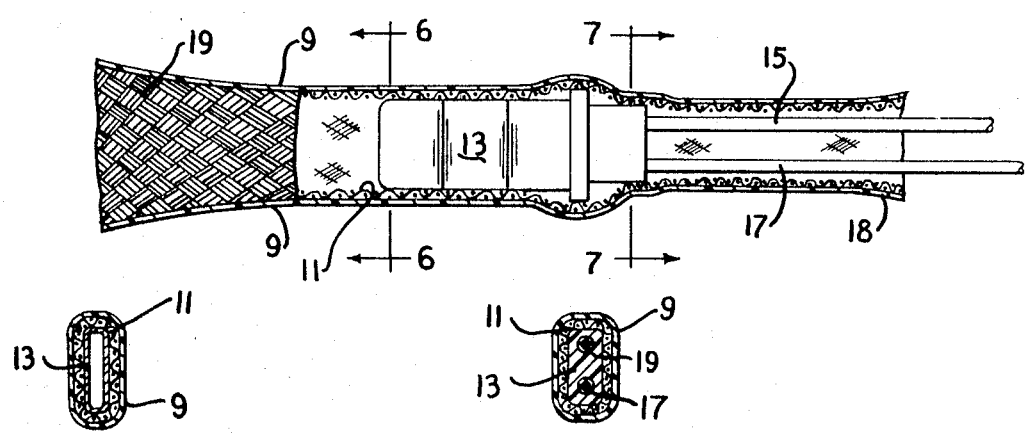
FIG.6.   FIG.7.
Bruce K. Slonneger,
Inventor.
Koenig, Senniger, Powers and Leavitt,
Attorneys.

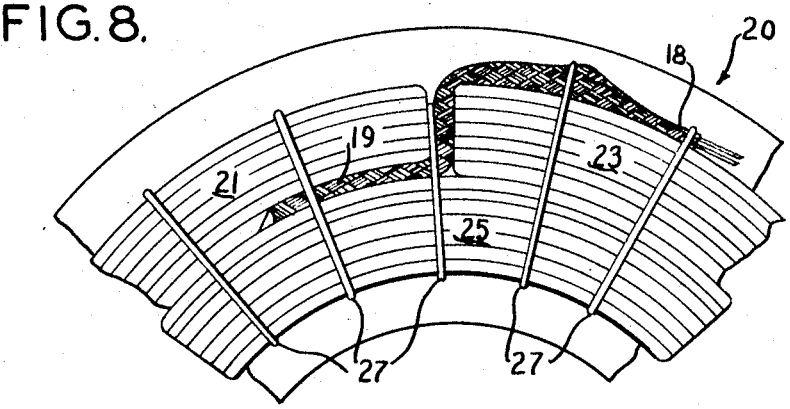
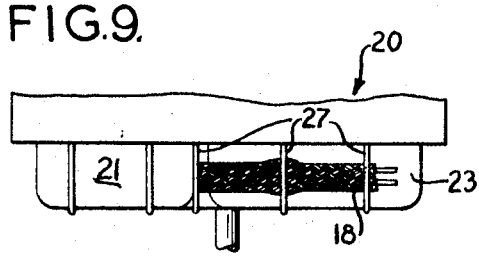
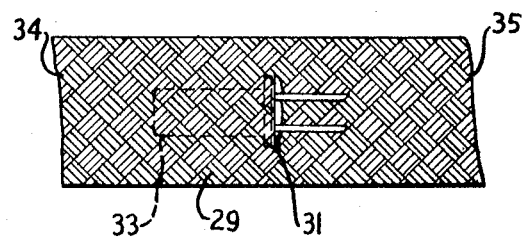
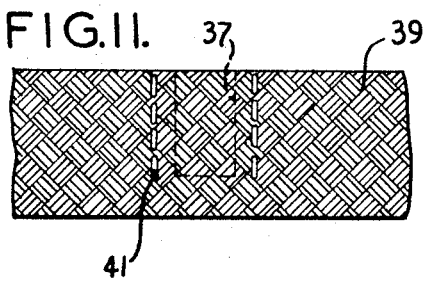
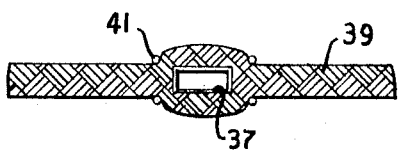
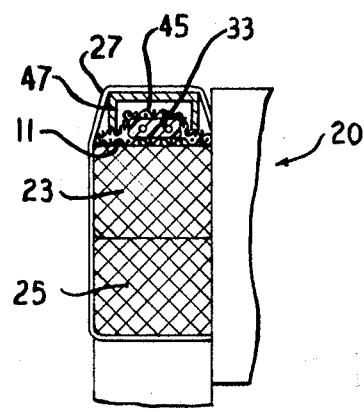

United States Patent Office 3,445,799
Patented May 20, 1969

3,445,799
ELECTRIC WINDING PROTECTIVE MEANS
Bruce K. Slonneger, Dayton, Ohio, assignor to Texas Instruments Incorporated, Dallas, Tex., a corporation of Delaware
Filed Oct. 17, 1966, Ser. No. 587,124
Int. Cl. H01h 37/04, 37/34, 37/52
U.S. Cl. 337—380                                5 Claims

ABSTRACT OF THE DISCLOSURE

A housed thermostatic switch is located in a tube made of bias-woven metal strands. After insertion of the switch into the tube, the latter is stretched whereupon it contracts peripherally and conforms to the exterior shape of the switch housing to provide good thermal contact. The stretched form of the tube provides flexible portions extending from the switch, which are made flat for engagement with and conformation to motor windings to be protected. Conductive switch leads to the motor windings extend from the tube, either from the opening at one or the other flat end thereof, or through a side opening effected by working apart the strands of its bias weave. In the latter case a rigid tubular or channel-shaped pocket-forming member is located adjacent the opening so that a pocket is formed and switches may be interchanged therein. This rigid member may be located inside of the woven tube and held in place by stitching of the woven tube around the rigid member, or located outside of it and fastened by the holding ties which are used to hold the motor windings in place.

---

This invention relates to electrical winding protective means and more particularly to such means which respond to high winding temperatures to deenergize the winding for preventing overheating thereof.

Among the several objects of the present invention may be noted the provision of a protector for electric windings, for example electric motor windings, which is in close thermal coupling with the winding to be protected; the provision of such a protector which is flexible in form and easily installed in different windings; and the provision of such a protector which is reliable in operation and inexpensive in construction. Other objects and features will be in part apparent and in part pointed out hereinafter.

Briefly, an electric winding protector according to the present invention includes temperature sensing means as for example a thermostatic switch for deenergizing the winding upon heating thereof, the switch being located in a heat-conductive woven tube which is expansible and contractible. The tube is of bias weave and capable of contracting radially under longitudinal tension to conformably enclose the switch within the tube. The woven strands of the tube are composed of heat-conductive material such as metal strands. The metal may be copper, iron or the like. The temperature sensing means or switch is disposed within the tube, the tube being contracted and substantially conforming to the exterior shape of the switch so as to provide good thermal contact therebetween. The contracted tube is of greater length than the length of the sensing means to provide a flexible heat-gathering and heat-conducting member extending from the switch, which member can be closely conformed to the winding to be protected for conducting heat from the winding to the switch. Thus when the winding overheats, heat will be quickly transmitted to the sensing means which will in turn deenergize the winding to protect it from reaching damaging high temperatures.

The invention accordingly comprises the constructions hereinafter described, the scope of the invention being indicated in the following claims.

In the accompanying drawings, in which various possible embodiments of the invention are illustrated, FIG. 1 illustrates a length of bias woven wire tubing in a longitudinally extended condition;

FIG. 2 is a cross section of the tubing as shown in FIG. 1;

FIG. 3 illustrates the same tubing as shown in FIG. 1 which has been radially expanded by longitudinal contraction;

FIG. 4 is a cross section of the tubing as shown in FIG. 3;

FIG. 5 illustrates the tubing telescoped over and radially contracted around a thermostatic switch to provide a closely fitting sheath;

FIGS. 6 and 7 are sections taken on lines 6—6 and 7—7, respectively, on FIG. 5;

FIG. 8 is an end view of a portion of the stator of an A.C. induction motor incorporating the protector of FIG. 5;

FIG. 9 is a top view on a reduced scale of the motor of FIG. 8 illustrating the installed protector;

FIGS. 10 and 11 illustrate modifications of the protector of this invention;

FIG. 12 is a top plan view of FIG. 11; and

FIG. 13 is a cross section illustrating another form of the invention.

Corresponding reference characters indicate corresponding parts throughout the several views of the drawings. The drawings, being diagrammatic are not to scale.

Referring now to FIG. 1, there is indicated generally at 11 a flexible tube which is bias-woven of fine heat-conductive copper wire. Such tubing is available in rolls, the tube being longitudinally extended as illustrated in FIG. 1 and more or less flattened as shown in FIG. 2 for winding.

Such tubing may be loosely woven and, as illustrated in FIGS. 3 and 4, may be expanded radially by longitudinally contracting it to provide a relatively large interior opening. In so opening, the bias angle of the weave changes as shown in the drawings. Conversely, applying longitudinal tension will cause the tubing to stretch and contract radially and to conform substantially to an object which is placed within the tube. Temperature-sensing means such as a thermostatic electric switch 13 of the type commonly placed in and wired into an electric motor circuit for thermal protection in placed within the tubing 11 (FIG. 5). The tubing is then subjected to longitudinal tension which causes it to contract around and substantially conform to the contour of switch 13. Switch leads 15 and 17 extend out through one end of the tubing. Since the tubing substantially conforms to the outside surface of switch 13, good thermal coupling is provided between the tube and the switch. Thermistor temperature sensing and control means may also be used in similar manner in place of the switch 13.

The extended length of tubing 11 is substantially longer than the lengthwise dimension of the switch 13 so that flexible and compliant tail portions 18 and 19 are provided extending from switch 13 in opposite directions. These tail portions provide heat conduits for efficiently thermally coupling switch 13 to windings which are to be protected from thermal damage. If necessary, the metal tubing 11 may be electrically insulated from the windings to be protected by a thin flexible plastic material which may be made to surround the wire tubing. This is not always necessary. Such surrounding plastic insulating material is shown for example at numeral 9.

FIG. 8 is an end view of the stator of an A.C. induction motor 20, the visible portions of the windings being the winding loops which bridge between different ones of the stator slots. Such motors typically include main or run winding as indicated at 21 and 23 and a start winding as indicated at 25. As may be seen in FIGS. 8 and 9, the protector switch 13 may be relatively easily installed on these windings by interleaving the tail portion 19 in between the different windings and by laying the portion of the tube containing the thermostatic switch 13 along the outer surface of one of the windings such as 23. The tail portion 18 may also lie along winding 23. The protector may be held in this position by string ties 27 such as are conventionally employed for holding the windings in place. Since the tubing 11 is flexible and compliant, it can be easily conformed to the particular shape of the windings so that an excellent thermal coupling or heat-transfer path is obtained between the windings and the thermostatic switch 13. Since the means providing the thermal coupling between switch 13 and the windings is highly compliant, it can be seen that a protetcor can be fitted to a variety of different motor constructions having different winding configurations.

As noted above, braided wire tubes as employed in the present invention may be woven relatively loosely. In such case, the individual strands of such a tubing as indicated at 29 in FIG. 10 may be worked apart to provide an opening as indicated diagrammatically at 31. A thermostatic switch 33 can thus be inserted directly through the sidewall of the tubing without going through and end opening of the tubing. By inserting switch 33 into the middle of a length of tubing in this fashion, both ends of the tubing may be employed as compliant heat-conducting tail portions, as indicated at 34 and 35 in FIG. 10. In this example, the elongate switch 33 extends longitudinally of the length of the tubing.

Instead of placing the thermostatic switch itself directly within woven tubing as illustrated in the previous examples, a rigid channel or socket for receiving a thermostatic switch may be placed inside the tubing. As illustrated in FIGS. 11 and 12, such a socket 37 is inserted through the sidewall of the length of woven wire tubing 39 transversely of the length of the tubing. Tubing 39 is then contracted around the socket 37 and is stitched as indicated at 41 to retain the socket in place. The tubing and socket may then be installed on a motor winding, the tubing being held by ties as described with reference to the previous examples. A thermostatic switch may then be later inserted into socket 37 and wired into a protective circuit after the completion of the motor construction. Heat developed in winding 43 is then transmitted through the tubing 39 and the socket 37 to the switch (not shown in FIGS. 11 and 12).

In FIG. 13 is shown a section of motor windings 23 and 25 on which is tied a length of the braided tubing 11. One of the tie strings is shown at 27. In this case, however, the tubing 11 is left in expanded condition to form a pocket 45, being opened next to the pocket as in the FIG. 10 arrangement for insertion and removal to and from the pocket 45 of a switch such as 33. To prevent crushing of the pocket 45 there is provided on the outside of the tubing 11 over the pocket a rigid channel-shaped piece 47 held by the tie string 27. This prevents the tie string 27 from crushing the pocket 45. Hence, switch replacements or substitutions may be worked into and out of the pocket as required without removing the tubing 11 from the winding 23.

In the above description, details of the internal thermostatic switch mechanisms within the switches such as 13 and 33 have not been described, inasmuch as their characters are well known to those skilled in the art.

In view of above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electrical winding protector comprising a flexible tube of woven metal wire, a heat-conductive pocket means fastened in the tube and open to the outside thereof, said tube extending from said pocket means thereby providing flexible heat-receiving and heat-conducting means extending from said pocket means and conformable to said winding for conducting heat therefrom to the pocket means, and a switch located in said pocket means.

2. An electrical winding protector according to claim 1, wherein said pocket means is fastened into the tube by stitching the tube around the pocket means.

3. A protector for motor windings, comprising a thermostatic switch having leads for connection with said windings, a flexible tube of bias-woven strands of metal wire to provide elongate flattened flexible open-end portions for flatwise engagement with and conformation to one or more of said windings, said leads extending through at least one sidewise opening through the strands of the tube, a rigid pocket-forming member adjacent to and within said sidewise opening for the interchange of switches in the pocket-forming member without collapse of the tube when a switch is removed and so that another switch may be conveniently received, said tube being stretched axially to surround and conform closely to the pocket-forming member for heat conduction to it and the switch.

4. A protector according to claim 3 wherein said rigid member is in the form of a socket having an open end adjacent the opening in the woven tube, and stitching through opposite sides of the tube for holding said socket in place.

5. A protector according to claim 3 wherein said rigid member is in the form of a channel having an open end held in place outside of the woven tube adjacent said sidewise opening in the latter to prevent any substantial collapse thereof when a switch is removed through said sidewise opening.

References Cited

UNITED STATES PATENTS

| | | | |
|---|---|---|---|
| 2,829,870 | 4/1958 | Poppe | 174—35.5 |
| 2,909,719 | 10/1959 | Dubberley | 318—473 |
| 3,213,246 | 10/1965 | Duval | 200—138.6 |

BERNARD A. GILHEANY, *Primary Examiner.*

R. L. COHRS, *Assistant Examiner.*

U.S. Cl. X.R.

174—52; 318—473